(No Model.) 2 Sheets—Sheet 2.

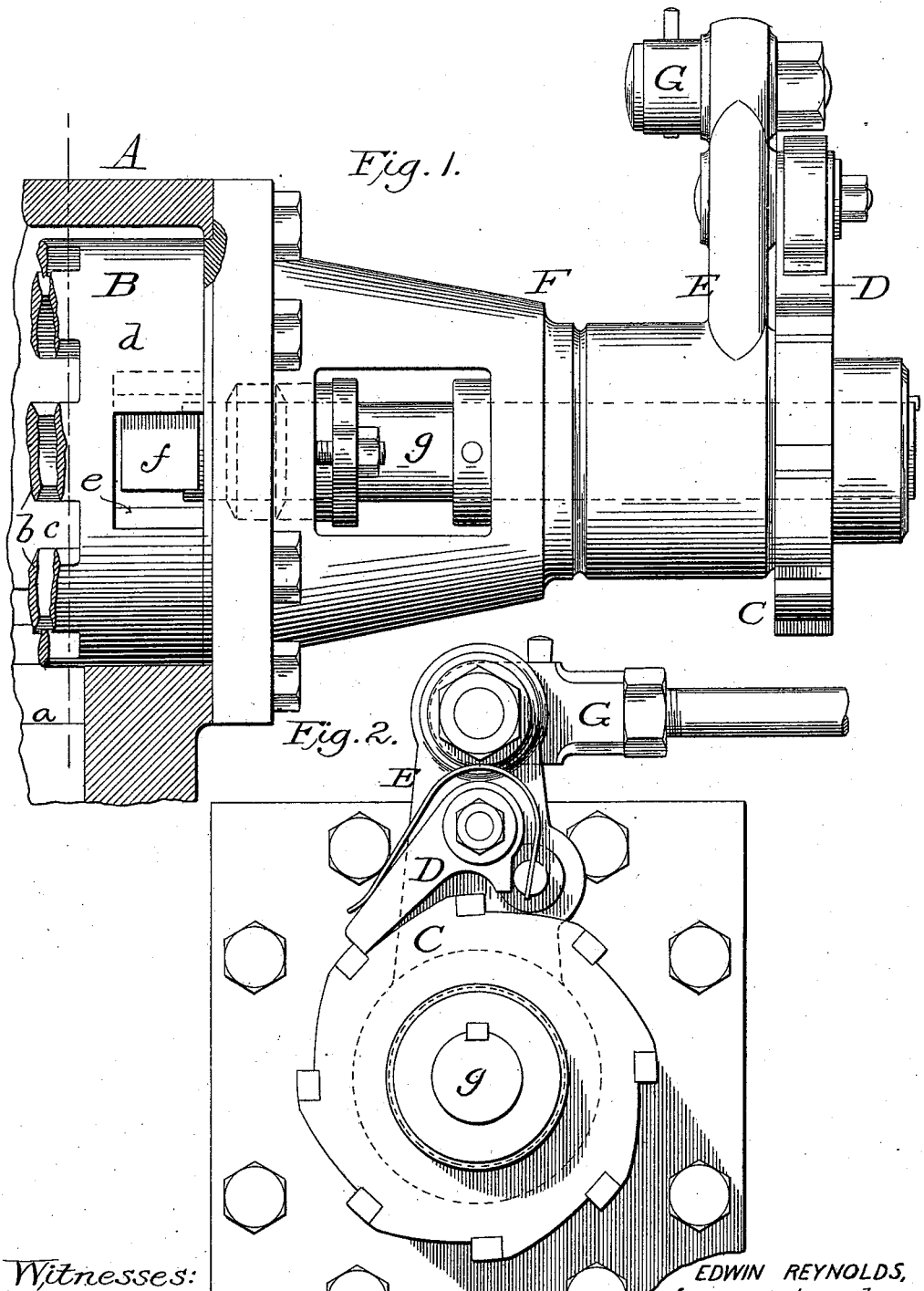

E. REYNOLDS.
VALVE MECHANISM FOR BLOWING ENGINES.

No. 522,273. Patented July 3, 1894.

Witnesses:
James F. Duhamel
Horace A. Dodge

EDWIN REYNOLDS,
Inventor,
by Dodge & Sons
Attys.

UNITED STATES PATENT OFFICE.

EDWIN REYNOLDS, OF MILWAUKEE, WISCONSIN.

VALVE MECHANISM FOR BLOWING-ENGINES.

SPECIFICATION forming part of Letters Patent No. 522,273, dated July 3, 1894.

Application filed May 1, 1893. Serial No. 472,537. (No model.)

*To all whom it may concern:*

Be it known that I, EDWIN REYNOLDS, a citizen of the United States, residing at Milwaukee, in the county of Milwaukee and State of Wisconsin, have invented certain new and useful Improvements in Valve Mechanism for Blowing-Engines, Air-Compressors, and Like Machinery, of which the following is a specification.

My invention relates to valve gear for blowing engines, air compressors and like machinery, and consists in a novel construction of the same whereby the opening and closing of the valve is rendered positive and rapid, and whereby also danger of disabling the machine is obviated.

Figure 4:
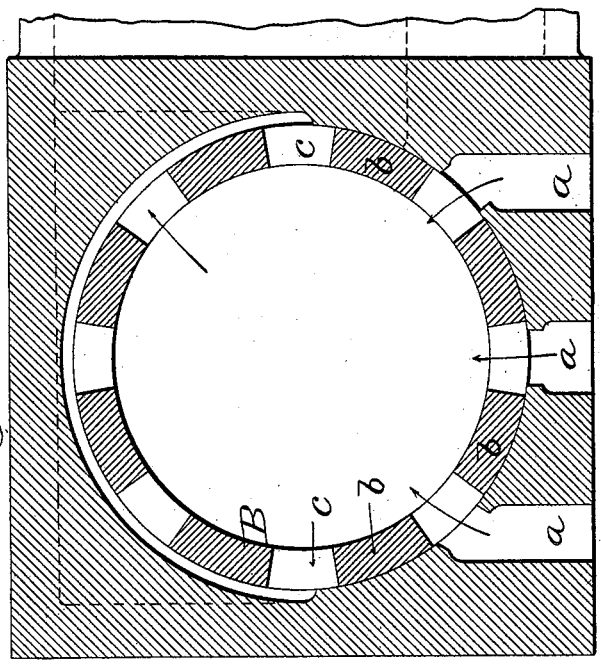
Figure 3:
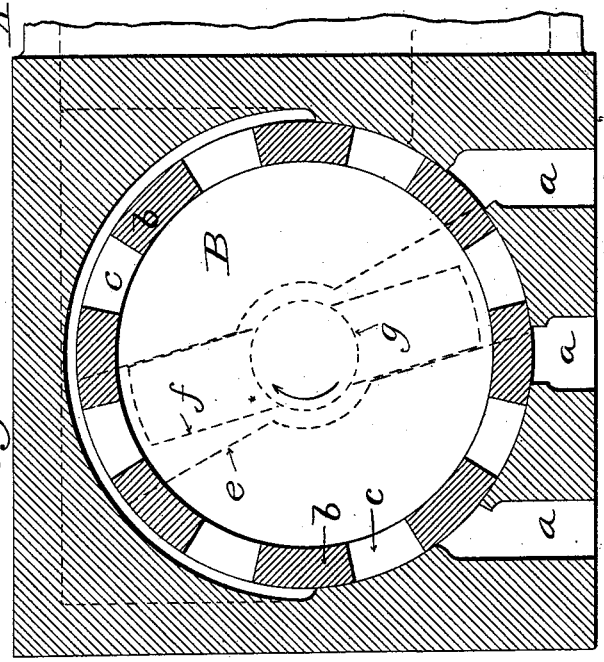

In the drawings,—Figure 1 is a longitudinal elevation of valve and gear, showing a part of the valve chamber in section, and the valve broken off; Fig. 2, a front end elevation; Fig. 3, a vertical cross sectional view of the valve and valve chamber, showing the discharge ports closed; Fig. 4, a similar view but with the discharge ports open; and Fig. 5, a perspective view of the valve and its stem.

A indicates the valve chamber and B the rotary valve mounted therein, and adapted to open and close the ports $a, a, a$, opening into the valve chamber. It will be observed upon reference to Figs. 1, 3 and 4, that the upper half of the valve chamber is enlarged so as to permit the valve to rise, at right angles to its axis, as hereinafter set forth. This enlargement also permits access of air to the interior of the valve regardless of its position upon its seat.

Figure 5:
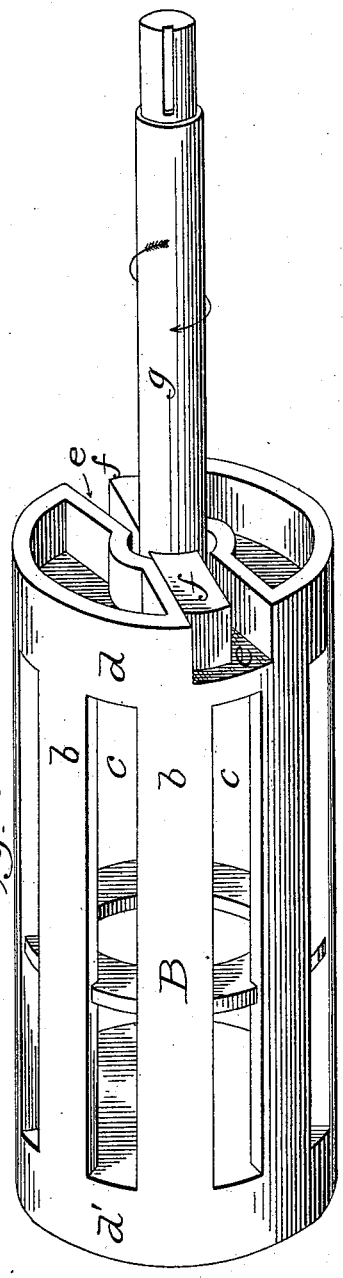

The valve B comprises a series of bars $b$ separated from one another to form ports $c$, and connected at the ends by plates or heads $d\ d'$ which close the ends of the valve. At the outer end of the valve, the head $d$ is provided with one or more sockets or seats $e$ adapted to receive a lug or wing $f$ projecting from the shaft or stem $g$, as shown in Fig. 5,—the said sockets or seats being of a width greater than that of the lugs so as to permit a limited play of the valve with relation to its stem, under certain circumstances. Keyed to the end of stem or shaft $g$ is a ratchet wheel C which is designed to be engaged by a pawl D carried by an oscillatory arm E,—the said arm being journaled upon an extension of the bonnet F. The arm E is actuated by means of a rod G connected with an eccentric on the engine shaft, so that when the arm E is carried forward its pawl D will engage the teeth of the ratchet wheel C and turn or rotate the valve from the position shown in Fig. 3, to the position shown in Fig. 4,—but when the arm moves backward the pawl will ride freely over the teeth of the ratchet wheel, thus permitting the valve to remain at rest during such backward movement of the arm. When the valve stem turns in the direction of the arrow in Fig. 5, the lugs or wings $f$ will engage one wall of the seats and turn the valve; but owing to the fact that these seats are wider than the lugs, there is always a space between the inactive faces of the lugs and the opposing wall of the seats or sockets, which will permit the valve to rise off its seat should the pressure in the cylinder become greater than the pressure in the receiver. This is a feature of importance, as compressors have been wrecked where the delivery valve failed to open, and the air, being subject to the action of the motive power and the inertia of the moving parts, was confined without a means of escape.

The number of bars and openings or ports in the valve may be varied as desired,—being determined by the required area for discharge. Their pitch or center distance is regulated by the time required for compression and release. The openings in the valve seat may be of most any desired number, but when there is more than one opening, the pitch or center distance of the openings must be the same as that of the openings in the valve.

In Fig. 3 the bars of the valve are shown as closing the discharge ports, which is the position they maintain during the period of taking in free air and compressing it to a determined pressure. When the air has about reached this point of compression, the valve begins to move to bring the openings therein into line with the corresponding openings in the valve chamber to permit the discharge. The valve continues to travel and finishes its closing movement at the end of the piston stroke. This is repeated at each stroke of the piston. The advantage of this form of valve and the method of operating it, is that the opening and closing are positive and rapid, thereby eliminating distortion on indicator-diagrams.

Having thus described my invention, what I claim is—

1. A hollow rotatable valve, having closed ends, and also a series of equally-spaced longitudinal bars *b* to form intermediate ports, in combination with a valve chamber having inlet and outlet ports and means for rotating the valve in but one direction.

2. In a blowing-engine or air-compressor, a cylindrical hollow valve having longitudinal bars separated from each other to form ports, and closed at its ends; means for rotating the valve in one direction; and a valve chamber provided with an inlet port to permit access of the air into the valve at all times, and provided also with an outlet port or ports.

In witness whereof I hereunto set my hand in the presence of two witnesses.

EDWIN REYNOLDS.

Witnesses:
 THEO. A. SCHROEDER,
 W. M. RUTH.